(12) United States Patent
Lanneluc et al.

(10) Patent No.: US 12,463,457 B2
(45) Date of Patent: Nov. 4, 2025

(54) UNINTERRUPTIBLE POWER SUPPLY CIRCUIT

(71) Applicant: COMMISSARIAT A L'ENERGIE ATOMIQUE ET AUX ENERGIES ALTERNATIVES, Paris (FR)

(72) Inventors: Charley Lanneluc, Grenoble (FR); Pierre Perichon, Grenoble (FR); Léo Sterna, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 47 days.

(21) Appl. No.: 18/533,987

(22) Filed: Dec. 8, 2023

(65) Prior Publication Data
US 2024/0195213 A1    Jun. 13, 2024

(30) Foreign Application Priority Data
Dec. 9, 2022    (FR) ..................... 2213055

(51) Int. Cl.
   *H02J 9/06*      (2006.01)
   *H02M 1/42*      (2007.01)
   *H02M 3/156*      (2006.01)

(52) U.S. Cl.
   CPC ........... *H02J 9/062* (2013.01); *H02M 1/4208* (2013.01); *H02M 3/156* (2013.01)

(58) Field of Classification Search
   CPC ...... H02J 9/062; H02M 1/4208; H02M 3/156; H02M 1/10; H02M 3/155; H02M 1/4233; H02M 7/5387; H02M 5/4505; H02M 1/007

USPC ............... 323/282, 284, 222, 285, 288, 283; 307/66, 64; 363/37, 89
See application file for complete search history.

(56) References Cited

U.S. PATENT DOCUMENTS

| | | | |
|---|---|---|---|
| 6,266,260 B1 * | 7/2001 | Zahrte, Sr. .............. | H02J 9/062 363/132 |
| 2005/0201127 A1 | 9/2005 | Tracy et al. | |
| 2010/0013311 A1 * | 1/2010 | Groff ....................... | H02J 9/061 307/66 |
| 2010/0013312 A1 * | 1/2010 | Groff ....................... | H02J 9/061 307/66 |
| 2011/0227418 A1 | 9/2011 | Pyboyina et al. | |

(Continued)

*Primary Examiner* — Elim Ortiz
(74) *Attorney, Agent, or Firm* — BakerHostetler

(57) ABSTRACT

An uninterruptible power supply circuit includes an inverter circuit configured to be connected to a first AC power grid, the power supply circuit moreover being configured to adopt a first configuration for supplying power to the first AC power grid from a second AC power grid, wherein first configuration a power factor correction circuit is configured to be connected to the second AC power grid so as to deliver a DC voltage to the inverter circuit, the power factor correction circuit comprising an inductor, and a first switch branch pertaining to the power factor correction circuit and the inverter circuit; and a second configuration for supplying power to the first AC power grid from a DC voltage source, wherein second configuration a DC-DC converter circuit is configured to be connected to the DC voltage source so as to deliver a DC voltage to the inverter circuit, the inductor moreover pertaining to the DC-DC converter circuit.

13 Claims, 3 Drawing Sheets

(56) References Cited

U.S. PATENT DOCUMENTS

2012/0181871 A1* 7/2012 Johansen ............... H02J 9/062
307/66
2022/0181905 A1 6/2022 Agrawal et al.

* cited by examiner

UNINTERRUPTIBLE POWER SUPPLY CIRCUIT

CROSS-REFERENCE TO RELATED APPLICATION

This application claims priority to foreign French patent application No. FR 2213055, filed on Dec. 9, 2022, the disclosure of which is incorporated by reference in its entirety.

FIELD OF THE INVENTION

The invention relates to an uninterruptible power supply circuit, specifically an uninterruptible power supply circuit that is configured to supply power to a first AC power grid from a second AC power grid, and to supply power to the first AC power grid from a DC voltage source if the second AC power grid has a fault.

BACKGROUND

Uninterruptible power supplies, or UPSs, are electrical devices intended to allow continuity of service in the event of an interruption in the supply of power to an electrical system from a power grid. By forming the interface between the power grid and the system, the uninterruptible power supply may also improve the quality of the power provided by the power grid. Systems that use UPSs include banks, hospitals, universities and data centres.

Typically, a UPS is configured to perform two electrical conversions. During normal operation, the UPS renders an AC/AC conversion in which a power taken from the AC power grid is delivered to the AC electrical system. In particular, the AC/AC converter circuit may comprise a first stage correcting a power factor taken from the electrical system and converting the AC voltage of the power grid into a DC voltage, and an inverter stage converting the DC voltage into an AC voltage that is delivered to the electrical system. In a manner known per se, the stage correcting the power factor ensures that the current and voltage delivered by the AC power grid are in phase. This prevents reactive power from being injected. This type of UPS, rendering an AC/DC conversion and a DC/AC conversion, is particularly advantageous in that it allows power of better quality than that delivered by the AC power grid to be delivered to the AC electrical system. If the AC power grid has a fault, a DC/AC conversion is rendered between a DC power source, such as a battery, and the AC electrical system so as to continue supplying power to the AC electrical system.

To reduce costs and increase the power density of the UPS, UPS manufacturers seek to pool electrical components between the circuit performing the AC/AC conversion and that performing the DC/AC conversion. The patent application publication US 2022/0181905 A1 is known, in which the AC/AC converter is partly reused in the DC/AC conversion. However, the document discloses a UPS that is independent in terms of frequency and voltage, a UPS that is used to deliver to the electrical system an AC signal having a frequency and an RMS voltage that are different from those of the power grid. However, some users may require the independent voltage functionality alone, namely a UPS delivering a voltage that is independent of that delivered by the power grid but preserving the frequency of the power grid.

An independent-voltage UPS is therefore sought in which the AC/AC and DC/AC functions are at least partly pooled to reduce cost and increase the power density of the UPS.

SUMMARY OF THE INVENTION

To this end, the invention proposes an uninterruptible power supply circuit comprising an inverter circuit configured to be connected to a first AC power grid, said power supply circuit moreover being configured to adopt:
  i. a first configuration for supplying power to the first AC power grid from a second AC power grid, in which first configuration a power factor correction circuit is configured to be connected to the second AC power grid so as to deliver a DC voltage to the inverter circuit, said power factor correction circuit comprising an inductor, and a first switch branch pertaining to the power factor correction circuit and the inverter circuit; and
  ii. a second configuration for supplying power to the first AC power grid from a DC voltage source, in which second configuration a DC-DC converter circuit is configured to be connected to the DC voltage source so as to deliver a DC voltage to the inverter circuit, said inductor moreover pertaining to said DC-DC converter circuit.

Thus, the circuit according to the invention pools components between the power factor correction circuit and the inverter circuit. In addition, the circuit pools components between the DC-DC converter circuit and the power factor correction circuit. The power supply circuit according to the invention therefore has improved integration of its components.

According to one embodiment, the power factor correction circuit comprises a second switch branch, the terminals of which are connected to the terminals of the first switch branch, a first terminal of said inductor being connected to the midpoint of one of the first and second branches, the midpoint of the other branch forming a first input terminal of the power factor correction circuit and a second terminal of said inductor forming a second input terminal of the power factor correction circuit, said first and second terminals of the power factor correction circuit being configured to be connected to the second AC power grid.

According to one variant, the DC-DC converter circuit moreover comprises the switch branch to which said inductor is connected.

According to one embodiment, in the first and second configurations, the inverter circuit comprises a third switch branch, the terminals of which are connected to the first switch branch, the midpoint of the third branch forming a first output terminal of the inverter circuit, said first output terminal of the inverter circuit and a second output terminal of the inverter circuit being configured to be connected to the first AC power grid.

According to one embodiment, the switch branch of the power factor corrector that is not connected to the inductor forms a branch of the inverter in the second configuration, the midpoint of this branch forming the second output terminal of the inverter circuit.

According to one variant, the inductor is connected to the first switch branch and, in the second configuration, the midpoint of the second switch branch forms the second output terminal of the inverter circuit.

According to one variant, the inductor is connected to the second switch branch, and in the second configuration the midpoint of the first branch forms the second output terminal of the inverter circuit.

According to one embodiment, in the first configuration, the midpoint of the first switch branch forms the second output terminal of the inverter circuit.

In one embodiment, in the first configuration, a midpoint of the first switch branch is intended to be connected to the neutral of the first AC grid and to the neutral of the second AC grid.

According to one embodiment, the uninterruptible power supply circuit comprises a DC link capacitor connected to the terminals of the first switch branch.

According to one embodiment, the uninterruptible power supply circuit comprises a set of switches that are configured to allow toggling between the first and second configurations, and vice versa.

According to one variant, the set of switches comprises two switches that are configured to connect and disconnect the power factor correction circuit to and from the second AC power supply in the first and second configurations, respectively.

According to one variant, the set of switches comprises a switch that is configured to disconnect and connect the DC voltage source from and to said inductor in the first and second configurations, respectively.

According to one variant, the set of switches comprises a switch that is configured to connect the second output terminal of the inverter circuit to the midpoint of the first switch branch in the first configuration and to connect the second output terminal of the inverter circuit to the midpoint of the second switch branch in the second configuration.

According to one embodiment, the uninterruptible power supply circuit is configured to adopt the second configuration if the second AC power grid has a fault.

BRIEF DESCRIPTION OF THE DRAWINGS

Other features and advantages of the present invention will become more apparent on reading the description that follows with reference to the following appended figures.

DETAILED DESCRIPTION

Figure 1:
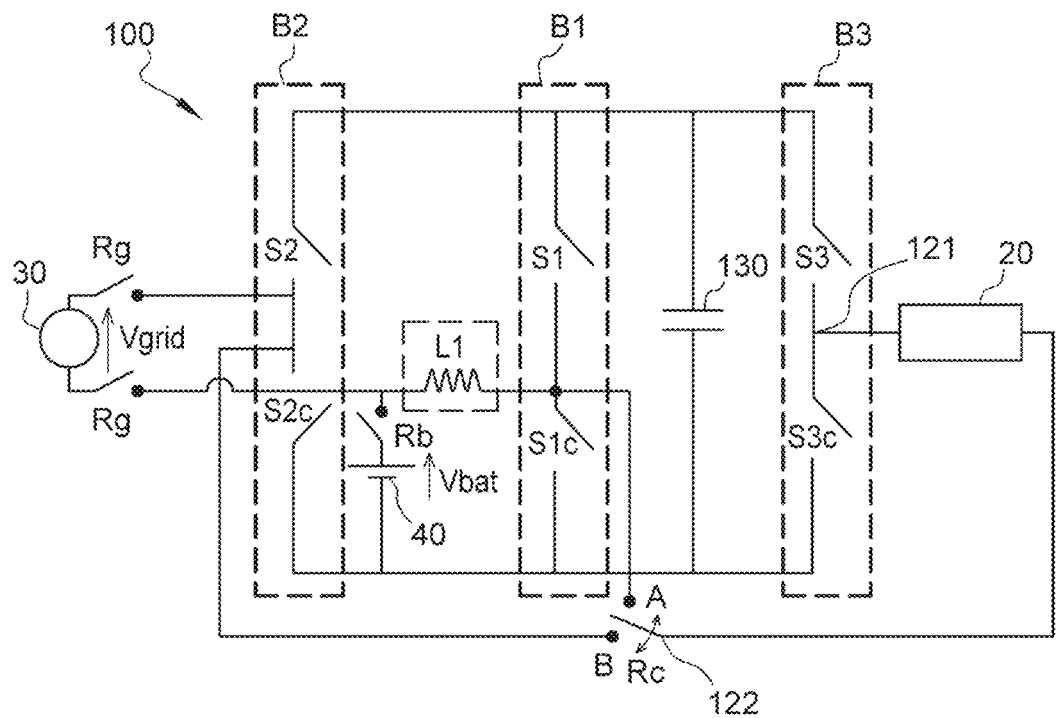
FIG. 1 shows an uninterruptible power supply circuit according to a first example of the invention.

FIG. 1 presents an uninterruptible power supply circuit 100 according to an example of the invention. The power supply circuit 100 is capable of taking at least two configurations to provide an uninterrupted supply of power to a first AC power grid 20 to which it is connected. The first AC power grid 20 pertains to an installation for which any interruption in the power supply must be avoided. An example of such an installation is a bank, a hospital, a university or a data centre.

In the first configuration, the power supply circuit 100 provides a supply of power to the first AC power grid 20 from a second AC power grid 30. The second AC power grid 30 is specifically a public power grid.

The power supply circuit 100 comprises a power factor correction circuit, which specifically ensures that the current drawn from the second power grid 30 is in phase with the voltage of the second power grid 30. To this end, the power factor correction circuit comprises an inductor L1 and switches S1, S1c, S2, S2c. The power factor correction circuit moreover converts the AC voltage from the second power grid 30 into a DC voltage.

The power supply circuit 100 moreover comprises an inverter circuit that is connected to the first AC power grid 20. In particular, courtesy of its switches S1, S1c, S3, S3c, the inverter circuit converts the DC voltage delivered by the power factor correction circuit into an AC voltage that is delivered to the first power grid 20.

The power factor correction circuit and the inverter circuit share a first switch branch B1. This is in particular possible because the power supply circuit 100 is independent in terms of voltage, but not in terms of frequency. In other words, the power supply circuit 100 regulates the RMS voltage delivered to the first power grid 20, such that it may be different from that delivered by the second power grid 30. However, the frequency delivered by the power supply circuit 100 remains equal to that of the second power grid 30. Specifically, the branch B1 switches at the frequency of the power grid 30, so as to allow a correction of the power factor delivered by the second power grid 30, but also a DC/AC conversion in order to deliver to the first power grid 20 an AC signal having a frequency equal to that of the second power grid 30. The first switch branch B1 specifically comprises a switch S1 connected to a high potential of the power factor correction circuit and of the inverter circuit. Also, a switch S1c connected to a low potential of the power factor correction circuit and of the inverter circuit. The two switches S1, S1c have a common terminal that constitutes the midpoint of the first branch B1. Being common to the power factor correction circuit and the inverter circuit, the first branch B1 receives a reduced current compared with a prior art circuit, thereby improving the output from the uninterruptible power supply circuit when it operates in the first configuration.

In particular, a DC link capacitor 130 is connected to the terminals of the first branch B1. This capacitor 130 forms a buffer between the power factor correction circuit and the inverter circuit, and stabilizes the DC voltage delivered to the inverter circuit by the power factor correction circuit.

In the second configuration, the power supply circuit 100 comprises a DC-DC converter circuit that is connected to a DC voltage source 40 in order specifically to deliver a DC voltage to the input of the inverter circuit. Thus, if the second AC power grid 30 has a fault, the DC voltage source 40 allows continuity in the supply of power to the first power grid 20. In particular, this is a temporary supply of power until a robust power source has been started, such as a generating set, for example. The DC voltage source 40 may be, among other things, a battery, such as for example a lithium/lead battery, or a supercapacitor. The battery may be installed in a rack of the uninterruptible power supply circuit. This circuit reuses the inductor L1 of the power factor correction circuit, thereby allowing the integration of the uninterruptible power supply circuit 100 to be improved. This is possible specifically because, in the second configuration, the power factor correction circuit is not connected to the second power grid, thus making it possible for its components to be reused by the DC-DC converter circuit.

The topology of the uninterruptible power supply circuit 100 is described more precisely below.

The power factor correction circuit specifically comprises a second switch branch B2. The terminals of this second branch B2 are connected to those of the first branch B1. In particular, the second branch B2 comprises a switch S2 connected to the high potential of the power factor correction circuit and a switch S2c connected to the low potential of the power factor corrector. The two switches S2, S2c have a common terminal that constitutes the midpoint of the second branch B2. As described above, the power factor correction circuit moreover comprises the first switch branch B1 and the inductor L1.

Figure 2:
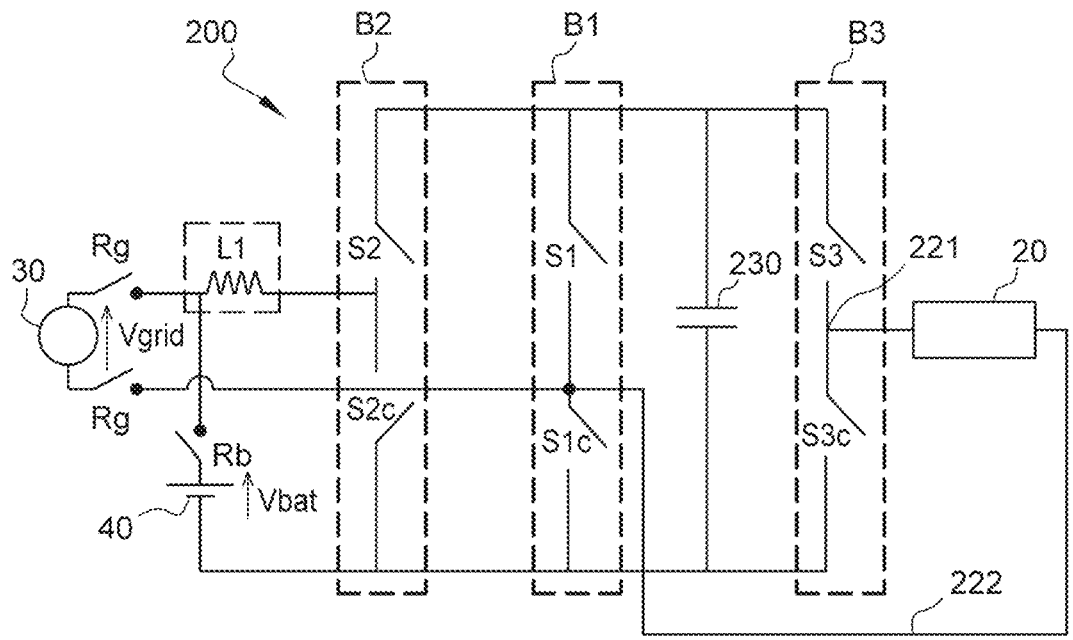
FIG. 2 shows an uninterruptible power supply circuit according to a second example of the invention.

In the example of FIG. 1, a first terminal of the inductor L1 is connected to the midpoint of the first branch B1. The power factor correction circuit is connected to the second power grid 30 via a first terminal, which corresponds to the midpoint of the second branch B2. A second terminal of the power factor correction circuit is formed by a second terminal of the inductor, which corresponds to the terminal of the inductor that is not connected to the midpoint of the first branch B1. However, the inductor L1 may be connected to the midpoint of the second branch B2, as for example in an uninterruptible power supply 200 according to another example of the invention that is illustrated in FIG. 2, which will be described later.

Apart from the first switch branch B1, the inverter circuit comprises a third switch branch B3. The terminals of this third branch B3 are connected to those of the first branch B1. In particular, the third branch B3 comprises a switch S3 connected to the high potential of the inverter circuit and a switch S3c connected to the low potential of the inverter circuit. The two switches S3, S3c have a common terminal that constitutes the midpoint of the third branch B3. This midpoint forms a first output terminal 121 of the inverter circuit. The first power grid 20 is connected between the first output terminal 121 and a second output terminal 122 of the inverter circuit.

Specifically, the uninterruptible power supply circuit 100 toggles between the first and second configurations courtesy of a set of switches Rg, Rb, Rc.

In particular, two switches Rg allow the second power supply 30 to be connected to the power supply circuit 100 in the first configuration. In the second configuration, the switches Rg disconnect the second power supply 30. To this end, a first switch Rg is preferably connected between the first terminal of the power factor correction circuit and a first terminal of the second power grid 30. A second switch Rg is preferably connected between the second terminal of the power factor correction circuit and a second terminal of the second power grid 30. These two switches Rg are specifically configured to open or close simultaneously.

Specifically, the set of switches moreover comprises a third switch Rb that, in the first configuration, disconnects the DC power source 40 from the inductor L1 and, in the second configuration, connects the DC power source 40 to the inductor L1. Thus, the DC voltage source 40 connects to the terminal of the inductor L1 that forms the second input terminal of the power factor correction circuit in the first configuration. The inductor L1 thus forms the inductor of the DC-DC converter circuit. In particular, the switch branch B1 connected to the inductor also pertains to the DC-DC converter.

In the example of FIG. 1, the set of switches comprises a fourth switch Rc. In the first configuration, this switch Rc connects the second terminal 122 of the inverter circuit to the midpoint of the first branch B1. In the second configuration, the fourth switch Rc connects the second terminal 122 of the inverter circuit to the midpoint of the second switch branch B2.

The first and second switches Rg, the third switch Rb and the fourth switch Rc are specifically relays, which are controlled in particular by a control unit of the uninterruptible power supply circuit 100.

The operation of the uninterruptible power supply circuit 100 in each configuration is more particularly described below.

In the first configuration, the second power grid 30 is connected to the input terminals of the power factor correction circuit, and delivers an AC voltage Vgrid. The power factor correction circuit is implemented by the first branch B1 and the second branch B2. The second output terminal 122 of the inverter is connected to the midpoint of the first branch B1. Thus, the inverter circuit is implemented by the first branch B1 and the third branch B3. In particular, in this first configuration, the midpoint of the first branch B1 is connected to the neutral of the first power grid 20 and to the neutral of the second power grid 30. The neutrals of the first 20 and second 30 grids are thus connected to one another. The power supply circuit then has a topology referred to as "unswitched neutral".

In particular, the second branch B2 chops the signal delivered by the second AC power grid 30 for a power factor correction. The switches S1, S1c in the first branch B1 are used to direct the discharge from the inductor L1. For example, the power factor correction circuit converts a 230 V RMS voltage of the second power grid 30 into a DC voltage of between 350 and 400 V. The third branch B3 chops the DC voltage available specifically at the terminals of the DC link capacitor 130. For example, the inverter circuit converts a DC voltage of between 350 and 400 V into a 230 V or 110 V RMS voltage signal. Specifically, the first switch branch B1 switches at the frequency of the second power grid 30, for example at 50 or 60 Hz. The second B2 and third B3 branches switch in a wider frequency range, for example between 20 and 70 kHz.

In the second configuration, the second power grid 30 is disconnected from the input terminals of the power factor correction circuit. The DC voltage source 40 is connected to the inductor L1, in particular to the terminal of the inductor L1 that is not connected to the first branch B1. The first branch B1 also pertains to the DC-DC converter. The DC-DC converter is therefore implemented by the inductor L1 and the first branch B1, which form a DC-DC boost converter. The second output terminal 122 of the inverter is connected to the midpoint of the second branch B2. Thus, the inverter circuit is implemented by the second branch B2 and the third branch B3, which specifically form a three-level full-bridge inverter circuit.

Specifically, the first branch B1 chops the DC voltage Vbat delivered by the DC voltage source 40. For example, the DC voltage Vbat is equal to 200 V and the DC-DC converter delivers a voltage of between 350 and 400 V on the DC bus. To this end, the switches S1, S1c in the first branch B1 switch for example at a frequency of between 10 kHz and 30 kHz, specifically 20 kHz. The second B2 and third B3 branches chop the DC voltage delivered by the DC-DC converter, specifically at a frequency of between 15 kHz and 70 kHz.

Figure 3:
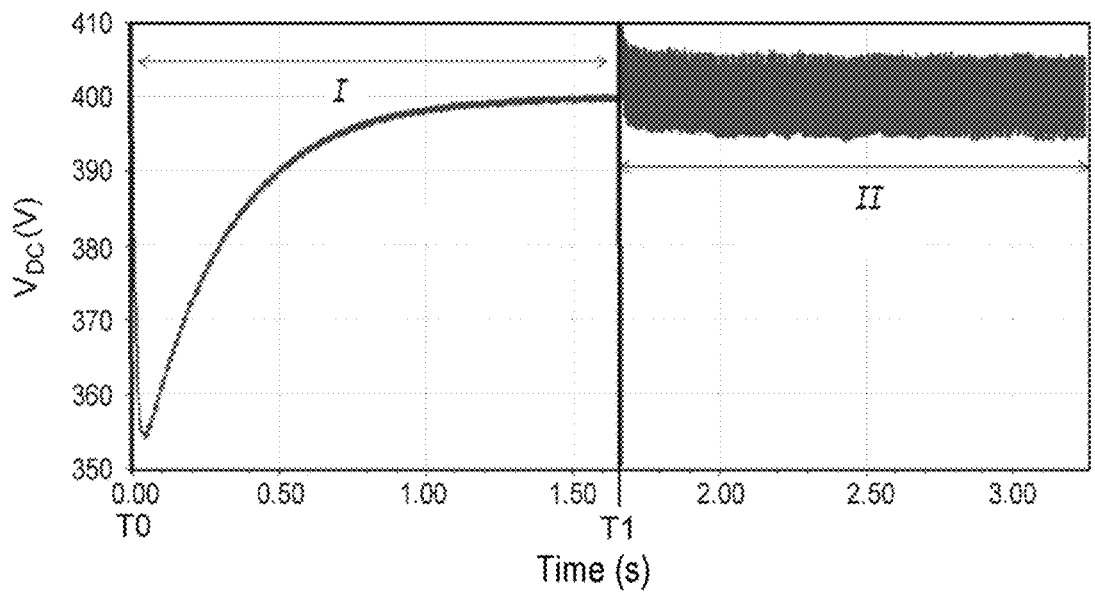
FIG. 3 shows the response of a signal in the uninterruptible power supply circuit of FIG. 1.
Figure 4:
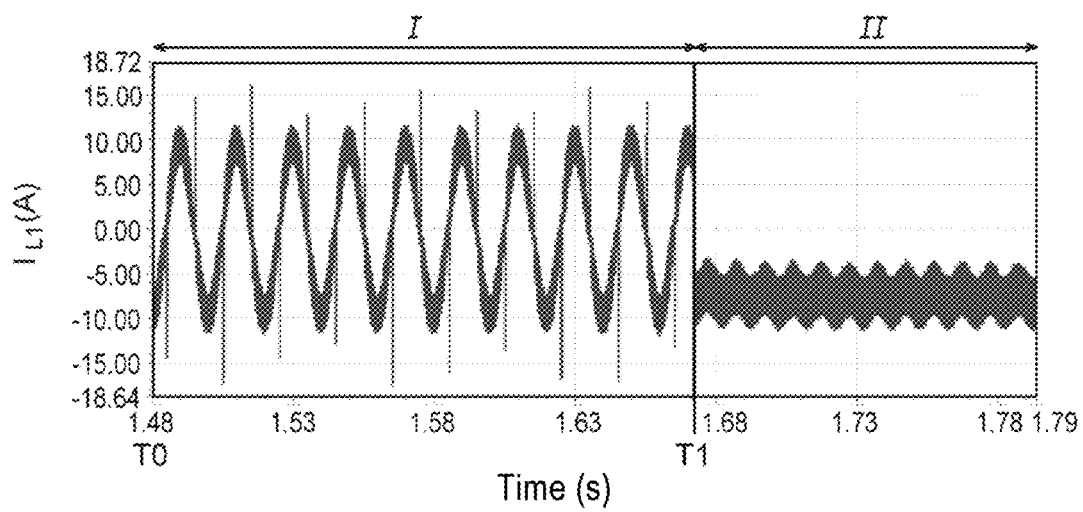
FIG. 4 shows the response of another signal in the uninterruptible power supply circuit of FIG. 1.
Figure 5:
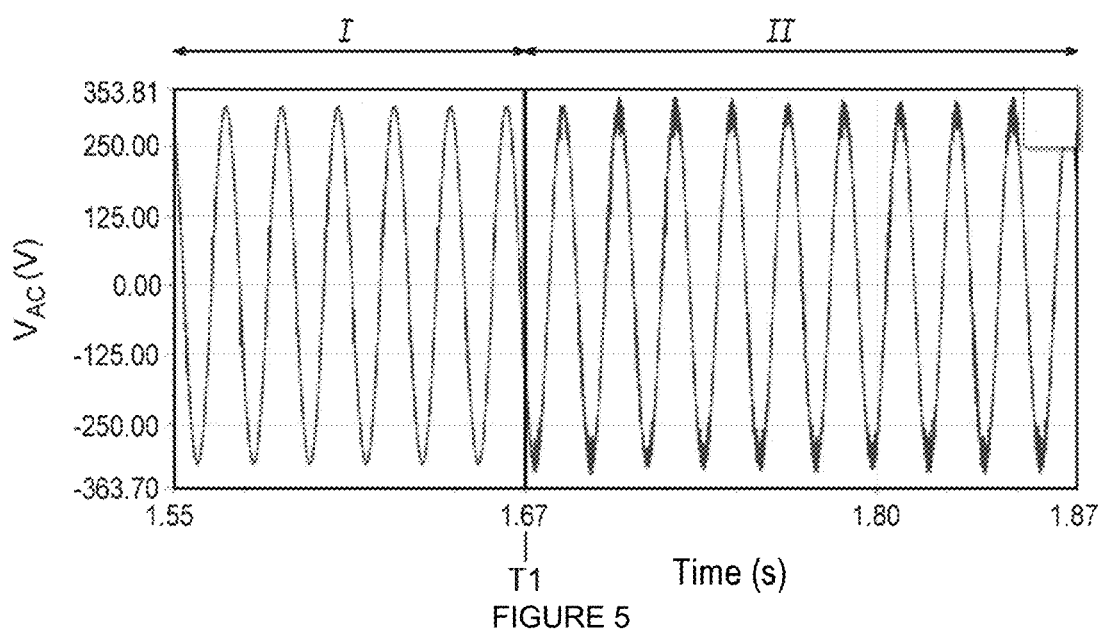
FIG. 5 shows the response of yet another signal in the uninterruptible power supply circuit of FIG. 1.

FIGS. 3 to 5 show curves illustrating the electrical signals carried by the power supply circuit 100 during operation. The curve in FIG. 3 shows the voltage $V_{DC}$ of the DC bus, that is to say on the terminals of the first branch B1, specifically on the terminals of the DC link capacitor 130. The curves in FIGS. 4 and 5 show the current $I_{L1}$ carried by the inductor L1 and the AC voltage $V_{AC}$ delivered to the first power grid 20, respectively.

At the time T0, the power supply circuit 100 starts to operate in the first configuration I, that is to say performs an AC/AC conversion from the second power grid 30 to the first power grid 20. In the first configuration I, the current in the inductor L1 is chopped at the chopping frequency of the second branch B2 and modulated at the frequency of the second AC power grid, specifically 50 Hz, in order to be in phase with the voltage of the second AC power grid. The current moreover has an RMS value that is dependent on the transmitted power and the voltage delivered by the second AC power grid. At the time T1≈1.67 s, the second power grid 30 is disconnected and the DC voltage source 40 is connected. This is specifically the case when the second AC power grid is lost. When the first configuration I changes to the second configuration II, a change in the current flowing in the inductor L1 is observed. In the second configuration II, the inductor L1 pertains to the DC/DC converter circuit, which is in particular a boost converter. The inductor L1 then carries a current chopped at the chopping frequency of the first branch B1, with an RMS value that depends on the transmitted power and the voltage delivered by the DC voltage source 40. Between the two configurations I, II, the voltage of the DC bus is maintained at 400 V and the output voltage of 230 V RMS remains properly regulated.

The example of the power supply circuit 200 of FIG. 2 will be described below according to its differences compared with the example illustrated in FIG. 1.

In the example in FIG. 2, a first terminal of the inductor L1 is connected to the midpoint of the second branch B2. The first terminal of the power factor correction circuit corresponds to the midpoint of the first branch B1. The second terminal of the power factor correction circuit is formed by a second terminal of the inductor, which corresponds to the terminal of the inductor that is not connected to the midpoint of the second branch B2.

The set of switches comprises the first switches Rg and the third switch Rb that have already been described with reference to FIG. 1. However, the power supply 200 lacks the fourth switch Rc. The second terminal 222 of the inverter circuit is permanently connected to the midpoint of the first branch B1. The advantage of this power supply circuit 200 over the first power supply circuit 100 is therefore that the set of switches comprises fewer switches, thereby reducing bulk, cost and integration complexity. However, the choice between the first power supply circuit 100 and the second power supply circuit 200 is dependent on the parameter that is to be focused on, for example temperature, mechanical wear or power consumption. The midpoint of the third branch B3 specifically forms the first output terminal 221 of the inverter circuit.

In its first configuration, the power supply circuit 200 has a topology similar to that of the power supply circuit 100 described above, except for the position of the inductor L1. Operation in the first configuration also remains similar to that of the power supply circuit 100 illustrated in FIG. 1.

However, the topology of the power supply circuit 200 in its second configuration is different from that of the power supply circuit 100 of FIG. 1.

In the second configuration, the second power grid 30 is disconnected from the input terminals of the power factor correction circuit. The DC voltage source 40 is connected to the inductor L1, in particular to the terminal of the inductor L1 that is not connected to the second branch B2. The second branch B2 also pertains to the DC-DC converter. The DC-DC converter is therefore implemented by the inductor L1 and the second branch B2, which form a DC-DC boost converter. The second output terminal 222 of the inverter is connected to the midpoint of the first branch B1. Thus, the inverter circuit is implemented by the first branch B1 and the third branch B3.

Specifically, the second branch B2 chops the DC voltage Vbat delivered by the DC voltage source 40. For example, the DC voltage Vbat is equal to 200 V and the DC-DC converter delivers a voltage of between 360 and 400 V on the DC bus. To this end, the switches S2, S2c of the second branch B2 switch for example at a frequency of between 10 kHz and 30 kHz. The first B1 and third B3 branches chop the DC voltage delivered by the DC-DC converter, specifically, at a frequency of between 15 kHz and 70 kHz.

The uninterruptible power supply circuit 200 illustrated in FIG. 2 specifically comprises a DC link capacitor 230 that is similar to that described with reference to FIG. 1.

The invention is thus used to obtain an AC/AC converter circuit pooled with the DC/AC converter circuit without major additional cost for the power supply circuit 100, 200.

The switches in the branches B1, B2, B3 need to be sized to cope with operations by the uninterruptible power supply circuit 100, 200. Owing to their high frequency in the first configuration, the switches S2, S2c in the first branch B2 and those S3, S3c in the third branch B3 are preferably produced in a technology that copes with high frequencies, such as for example using GaN or SiC technology. The switches S1, S1c in the first branch 1 encounter relatively lower frequencies and may be produced using silicon technology. However, the switches implementing the DC-DC converter circuit also need to be able to cope with the current delivered by the DC voltage source 40 in the second configuration, specifically for a maximum period of 10 mn. These switches are therefore oversized compared with the demands of the first configuration. In this regard, the variant in which the first branch B1 contributes to the DC-DC converter is more advantageous than that in which the second branch B2 contributes to the DC-DC converter circuit. This is because oversizing the switches leads to an increase in their cost. However, switches using GaN or SiC technology are more expensive than those using silicon technology. The other switches not involved in the DC-DC converter circuit are preferably sized only for the first configuration, even though their performance would be lower in the second configuration. This is because, over the life of the power supply circuit 100, 200, the first configuration ought to account for most of the operating time, specifically more than 90%, in particular in countries that are not much subject to serious power grid problems. It is therefore possible to afford a lower output in the second configuration for these switches.

In a manner known per se, to prevent the switches from breaking when changing between the first and second configurations, it is preferable to provide for a freewheel path to dissipate any residual charges. The order in which the switches close/open may allow this to be achieved.

The invention claimed is:

1. An uninterruptible power supply circuit comprising an inverter circuit configured to be connected to a first AC power grid, said power supply circuit configured to:
   i. a first configuration for supplying power to the first AC power grid from a second AC power grid, wherein first configuration a power factor correction circuit is configured to be connected to the second AC power grid so as to deliver a DC voltage to the inverter circuit, said power factor correction circuit comprising an inductor (L1), and a first switch branch (B1) pertaining to the power factor correction circuit and the inverter circuit; and ii. a second configuration for supplying power to the first AC power grid from a DC voltage source, in which second configuration a DC-DC converter circuit is configured to be connected to the DC voltage source so as to deliver a DC voltage to the inverter circuit, said inductor (L1) moreover pertaining to said DC-DC converter circuit, said inverter circuit being configured to convert the DC voltage delivered by the power factor correction circuit into an AC voltage that is delivered to the first power grid, wherein the power factor correction circuit comprises a second switch branch (B2), the terminals of which are connected to the terminals of the first switch branch (B1), a first terminal of said inductor (L1) being connected to the midpoint of one of the first and second branches (B1, B2), the midpoint of the other branch forming a first input terminal of the power factor correction circuit and a second terminal of said inductor (L1) forming a second input terminal of the power factor correction circuit, said first and second terminals of the power factor correction circuit being configured to be connected to the second AC power grid, wherein the switch branch of the power factor corrector that is not connected to the inductor (L1) forms a branch of the inverter in the second configuration, the midpoint of this branch forming the second output terminal of the inverter circuit.

2. The uninterruptible power supply circuit according to claim 1, wherein the DC-DC converter circuit moreover comprises the switch branch to which said inductor (L1) is connected.

3. The uninterruptible power supply circuit according to claim 1, wherein, in the first and second configurations, the inverter circuit comprises a third switch branch (B3), the terminals of which are connected to the first switch branch (B1), the midpoint of the third branch (B3) forming a first output terminal of the inverter circuit, said first output terminal of the inverter circuit and a second output terminal of the inverter circuit being configured to be connected to the first AC power grid.

4. The uninterruptible power supply circuit according to claim 1, wherein the inductor (L1) is connected to the first switch branch (B1) and, in the second configuration, the midpoint of the second switch branch (B2) forms the second output terminal of the inverter circuit.

5. The uninterruptible power supply circuit according to claim 1, wherein the inductor (L1) is connected to the second switch branch (B2), and in the second configuration the midpoint of the first branch (B1) forms the second output terminal of the inverter circuit.

6. The uninterruptible power supply circuit according to claim 3, wherein, in the first configuration, the midpoint of the first switch branch (B1) forms the second output terminal of the inverter circuit.

7. The uninterruptible power supply circuit according to claim 1, wherein, in the first configuration, a midpoint of the first switch branch (B1) is intended to be connected to the neutral of the first AC grid and to the neutral of the second AC grid.

8. The uninterruptible power supply circuit according to claim 1, comprising a DC link capacitor connected to the terminals of the first switch branch (B1).

9. The uninterruptible power supply circuit according to claim 1, comprising a set of switches (Rg, Rb, Rc) that are configured to allow toggling between the first and second configurations, and vice versa.

10. The uninterruptible power supply circuit according to claim 9, wherein the set of switches comprises two switches (Rg) that are configured to connect and disconnect the power factor correction circuit to and from the second AC power supply in the first and second configurations, respectively.

11. The uninterruptible power supply circuit according to claim 9, wherein the set of switches comprises a switch (Rb) that is configured to disconnect and connect the DC voltage source from and to said inductor (L1) in the first and second configurations, respectively.

12. The uninterruptible power supply circuit according to claim 4, comprising a set of switches (Rg, Rb, Rc) that are configured to allow toggling between the first and second configurations, and vice versa, wherein the set of switches comprises a switch (Rc) that is configured to connect the second output terminal of the inverter circuit to the midpoint of the first switch branch (B1) in the first configuration and to connect the second output terminal of the inverter circuit to the midpoint of the second switch branch (B2) in the second configuration.

13. The uninterruptible power supply circuit according to claim 1, wherein the power supply circuit is configured to adopt the second configuration when the second AC power grid has a fault, and wherein the power supply circuit is not configured to adopt the second configuration when the second AC power grid does not have a fault.

* * * * *